US007143208B2

(12) United States Patent
Tsutsui

(10) Patent No.: US 7,143,208 B2
(45) Date of Patent: Nov. 28, 2006

(54) COMMUNICATION DEVICE, HOST APPARATUS, AND COMMUNICATION METHOD

(75) Inventor: Tatsumi Tsutsui, Kasugai (JP)

(73) Assignee: Fujitsu Limited, Kanagawa (JP)

( * ) Notice: Subject to any disclaimer, the term of this patent is extended or adjusted under 35 U.S.C. 154(b) by 157 days.

(21) Appl. No.: 10/718,548

(22) Filed: Nov. 24, 2003

(65) Prior Publication Data

US 2004/0148431 A1 Jul. 29, 2004

(30) Foreign Application Priority Data

Nov. 25, 2002 (JP) ............................ 2002-341096

(51) Int. Cl.
G06F 3/00 (2006.01)
G06F 13/00 (2006.01)
G06F 7/06 (2006.01)
G06F 11/00 (2006.01)
G06F 13/22 (2006.01)

(52) U.S. Cl. .............................. 710/33; 710/8; 710/15; 710/17; 710/18; 709/230; 714/2; 714/5; 714/30; 714/44

(58) Field of Classification Search .................... 710/8, 710/15, 17, 18, 19; 709/230; 714/2, 5, 30, 714/44

See application file for complete search history.

(56) References Cited

U.S. PATENT DOCUMENTS

| 6,044,216 A | * | 3/2000 | Bhargava et al. ............ 717/114 |
| 6,173,355 B1 | * | 1/2001 | Falik et al. .................. 710/310 |
| 6,311,294 B1 | * | 10/2001 | Larky et al. .................. 714/44 |
| 6,721,332 B1 | * | 4/2004 | McAlear ...................... 370/466 |

OTHER PUBLICATIONS

Universal Serial Buss Mass Storage Class, Bulk-Only Transport (Sep. 31, 1999), electronic copy at: http://www.usb.org/developers/devclass_docs/usbmassbulk_10.pdf.*

* cited by examiner

Primary Examiner—Kim Huynh
Assistant Examiner—Scott Sun
(74) Attorney, Agent, or Firm—Bingham McCutchen LLP

(57) ABSTRACT

A method and apparatus for communicating data between a device and a host apparatus through a USB interface detects and corrects USB transaction phase deviation due to erroneous recognition of handshake packets. A method comprises the steps of transmitting a first packet from the device to the host apparatus, the first packet being erroneously recognized by the host apparatus as a first type of packet, receiving a second packet from the host apparatus at the device in response to the first packet, and transmitting a third packet from the device to the host apparatus, the third packet being the first type of packet, in response to receiving the second packet from the host apparatus.

20 Claims, 7 Drawing Sheets

BLOCK DIAGRAM ILLUSTRATING
THE FIRST EMBODIMENT

BLOCK DIAGRAM ILLUSTRATING
THE THIRD EMBODIMENT

DIAGRAM ILLUSTRATING FORMATS OF PACKETS

COMMUNICATION DEVICE, HOST APPARATUS, AND COMMUNICATION METHOD

CROSS-REFERENCE TO RELATED APPLICATIONS

This application is based upon and claims the benefit of priority from the prior Japanese Patent Application No.2002-341096, filed in Nov. 25, 2002, the entire contents of which are incorporated herein by reference.

FIELD OF THE INVENTION

The present invention relates to a communication device, a host apparatus and a communication method for data communication through a USB interface.

BACKGROUND OF THE INVENTION

Description of Related Art

In recent years, the USB (Universal Serial Bus) interface has become widely spread as a type of serial interface for communicating between a computer (host apparatus) including the host function and peripheral devices connected to the computer. A problem that may arise, some cases, in using the USB interface, is that the host apparatus may erroneously recognize an error in a peripheral device. A need arises for a technique that will avoid of deviation of the protocol phase of operation of the USB interface due to such erroneous recognition of error.

Data communication using the USB interface is generally performed in units called transactions. A transaction is formed from a plurality of packets. These packets include SOF packets, token packets, data packets, and handshake packets.

FIG. 8 is a diagram for describing formats of respective packets.

The SOF packet P1 shows the start of a frame which is generated every 1 ms by the host apparatus. The token packet P2 is generated by the host apparatus when the transaction starts. Moreover, the data packet P3 is used when the data is transferred. The handshake packet P4 is used to report the results of the transaction.

The SOF packet P1 has a synchronization (Synchronize: SYNC) field, a packet ID (PID) field, a frame number (Frame Number) field, an error determination (Cyclic Redundancy Check: CRC) field and an end (End of Packet: EOP) field.

The token packet P2 has a SYNC field, a PID field, an address (ADDR) field, an end point number (ENDP) field, a CRC field and an EOP field.

The data packet P3 has a SYNC field, a PID field, a data (DATA) field, a CRC field, and an EOP field.

The handshake packet P4 has a SYNC field, a PID field and an EOP field.

All packets P1 to P4 start with the SYNC field of 8-bit length, immediately followed by the PID field of 8-bit length. This SYNC field is used for synchronization of a communication signal, while the PID field is used to identify the type of packet. Moreover, all packets P1 to P4 end with the EOP field of 2-bit length.

The frame number field of 11-bit length in the SOF packet P1 is used to indicate the frame number of the transaction, while the CRC field of 5-bit length is used for checking an error for the data of the frame number field.

The ADDR field of 7-bit length in the token packet P2 is used to designate a device that is the receiving destination and the ENDP field of 4-bit length is used to identify the end point of the device. The end point means a FIFO buffer which is used for data transfer. Moreover, the CRC field of 5-bit length in the token packet P2 is used for error checking for the data of the ADDR field and ENDP field.

The DATA field in the data packet P3 is used for data transfer and the CRC field of 16-bit length is used for error checking of the DATA field.

The handshake packet P4 includes only a SYNC field, a PID field and an EOP field. The handshake packet may be classified into an acknowledge (ACK) packet, for notifying of successful data reception, a non-acknowledge (NAK) packet for requesting, for example, re-transmission of data, and a STALL packet, for notifying that data transmission and reception are impossible.

FIG. 9 illustrates the operation when an error is generated in the device side of the communication system conforming to the bulk-only communication protocol of USB (conforming to the USB Mass Storage Class Bulk Only Transport 1.0).

When an error is generated in a device as illustrated in FIG. 9, the relevant device transmits the STALL packet to the host apparatus (step 1). Upon reception of the STALL packet, the host apparatus recognizes that the device has stopped the data transfer phase. Thereby, the data transfer from the host apparatus may be suspended.

Thereafter, the host apparatus transmits a clear feature command to the device (step 2). The device clears the end point in response to the clear feature and then transmits a status information (CSW) (step 3). The host apparatus reads the status information from the device and re-starts the data transfer by executing the transaction for such status information.

For instance, the patent document 1 (Japanese Published Unexamined Patent Application No.264185/1992) discloses an apparatus which can detect recovery of a failure or occurrence of a failure in the communication system. Moreover, the patent document 2 (Japanese Published Unexamined Patent Application No. 89510/1979) discloses a method for verification of transmission based on the response signal to the data transmitted.

In the error processing protocol of FIG. 9, the host apparatus sometimes enters a situation in which it erroneously recognizes a failure of the device even when the device does not transmit the STALL packet.

For example, the signal of a packet is sometimes transmitted erroneously because of the influence of external noise and the influence of jitter in the PLL circuit that generates the clock. Usually, if such an error is generated, the packet is determined to be invalid through the verification of the information in the CRC field of the packet. However, unlike the other packets P1 to P3, the handshake packet P4, such as an ACK packet, a NAK packet, and a STALL packet, does not have the CRC field (refer to FIG. 8) and therefore matching is verified only with the PID field. In particular, in the PID field, the type of packet is indicated with four bits and an error is checked with the remaining four bits. In the PID field, the remaining four bits are the data of the four bits indicating the kind of packet inverted in logical level. Therefore, if two bits are in error in the PID field, erroneous recognition of the type of packet may occur.

In particular, bit errors are easily generated in devices that are easily influenced by external noise, such as a mobile devices, mobile information terminals, communication devices used for space engineering, and in devices that have a large amount of jitter in their clock signals.

As a particular example of the erroneous recognition of the handshake packet P4, the ACK packet or NAK packet is erroneously recognized as the STALL packet. The ACK packet and NAK packet are issued for verifying reception of data through the packet transfer, while the STALL packet is issued for suspending data transfer. Therefore, when the host apparatus erroneously recognizes the ACK packet or NAK packet as the STALL packet, deviation of protocol phase is generated in which only the host apparatus suspends the data transfer and the device tries to continue the normal data transfer protocol.

FIG. 10 illustrates the operations when the host apparatus erroneously recognizes the ACK packet or NAK packet from the device as the STALL packet.

First, the normally operating device transmits the ACK packet or NAK packet (step 1a). When the host apparatus erroneously recognizes that it has received the STALL packet, the host apparatus issues a clear feature command to the device (step 2a). Thereafter, it tries to execute the transaction for the status information (CSW).

However, since the device did not actually transmit the STALL packet and does not recognize occurrence of an error, it continues the data transfer in accordance with the ordinary protocol (step 3a). As a result, deviation is generated in the protocol in the host apparatus side and device side. Namely, the device transmits the data but the host apparatus interprets that this data is the status information (CSW). Accordingly, a problem arises here. Namely, the data intended by the transmitting side and receiving side is different.

In this case, the host apparatus inspects signature information included in the data received in the step 3a, which is considered as the status information. However, since the signature information does not match with the normal value, the host apparatus thinks that a failure has been generated in the device. The host apparatus that has detected the failure resets the device. Namely, the device is forcibly reset based on erroneous recognition by the host apparatus even when the device is operating normally and is capable of transferring the data. If the normal device is reset as described above, processing time taking a number of seconds is required for recovery and thereby reliability of the sequence is lost.

Particularly, in the bulk-only communication protocol of USB, the port for data transfer and the port for transfer of status information are used in common. Accordingly, it is difficult to determine deviation of the protocol phase described above and the associated drop in system reliability due to erroneous recognition of the handshake packet may be considered to be a problem.

SUMMARY OF THE INVENTION

To solve the above problem, the present invention provides a communication device, a host apparatus and a communication method in which avoid protocol phase deviation when the handshake packet is recognized erroneously.

A further aspect of the present invention is that data communication with a host apparatus is performed via a USB interface in order to achieve the objects described above. In USB data communication, when a first packet is transmitted to the host apparatus, the host apparatus sometimes erroneously recognizes that it has received a packet which is a different type from the packet that was transmitted. In this case, erroneous recognition of the packet is detected with a packet detector, which detects a second packet received from the host apparatus. Accordingly, deviation of protocol phase between the host apparatus and communication device can be avoided by transmitting a third packet with the transmitting means when such erroneous recognition is detected.

A further aspect of the present invention is that the bulk-only communication system may be used as the communication system for the host apparatus. Moreover, the packet transmitted to and received by the host apparatus may include an ACK packet or a NAK packet. When the host apparatus recognizes that it has received the second packet even if the ACK packet or NAK packet is transmitted, since the predetermined command is outputted from the host apparatus, erroneous recognition of the host apparatus can be detected based on such command.

A further aspect of the present invention is that the number of times of reception of the predetermined command is counted and the number of times of transmission of the second packet is also counted. A failure of the communication system is measured based on the number of times of reception and transmission. In the USB communication protocol, after the second packet is transmitted to the host apparatus from a device, the host apparatus transmits the predetermined command. The number of times of generation of a failure in the communication system can be measured by calculating, with a determining unit, a difference between the number of times of reception of the predetermined command and the number of times of transmission of the second packet.

A further aspect of the present invention is that the second packet is the STALL packet to notify that the data transfer is suspended.

A further aspect of the present invention is that the data communication with the communication device can be performed via the USB interface. In USB data communication, when a first packet is transmitted to the host apparatus, the host apparatus sometimes erroneously recognizes that it has received a packet which is a different type from the packet that was transmitted. In order to avoid deviation of the protocol phase due to such erroneous recognition, an auxiliary protocol is executed to verify deviation of the protocol phase.

In particular, when the packet received by the host apparatus is recognized as a particular type of packet twice in a row, the predetermined command is transmitted from the host apparatus as the auxiliary protocol.

As described above, the present invention avoids protocol phase deviation when the STALL packet is erroneously recognized by the host apparatus via a USB interface.

DETAILED DESCRIPTION OF THE INVENTION

First Embodiment

A first embodiment of the present invention in a communication apparatus will be described with reference to the accompanying drawings.

Figure 1:
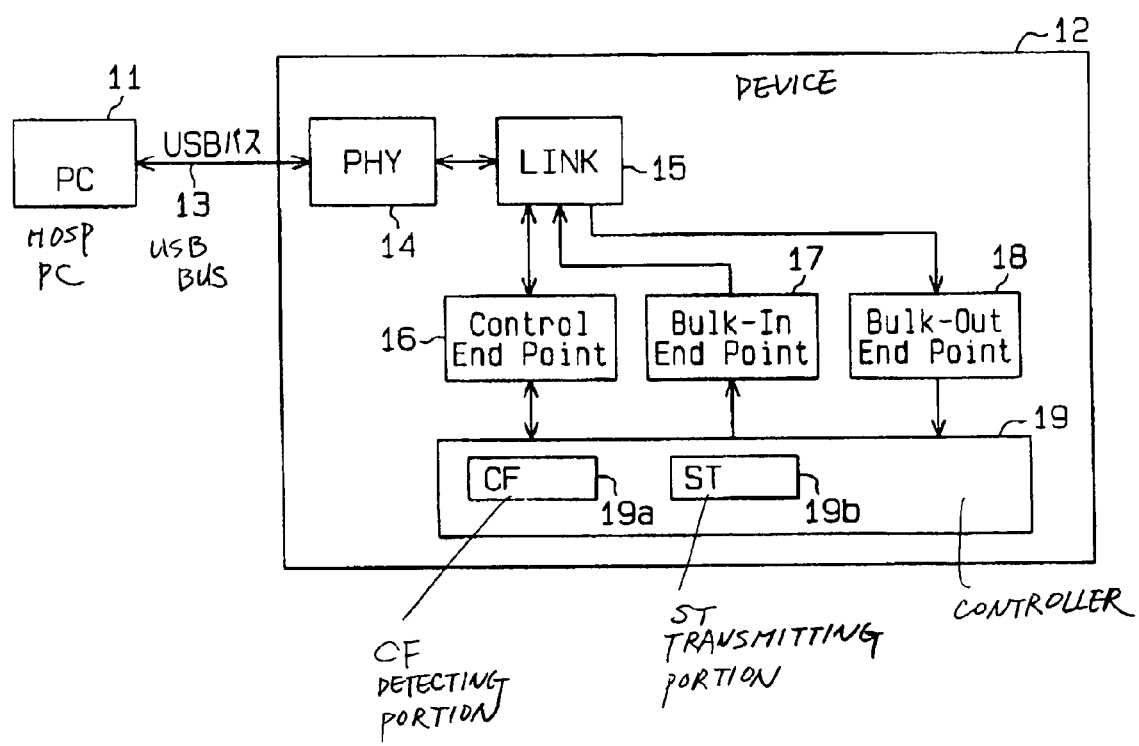
FIG. 1 is a block diagram illustrating a first embodiment.

FIG. 1 is a block diagram of a communication system for data transfer conforming to the Universal Serial Bus (USB) interface standards. As illustrated in FIG. 1, a host PC (host apparatus) 11 provided for management of communications by the USB is connected with a device 12 via a USB bus 13. The device 12 is, for example, a hard disk drive conforming to the USB Mass Storage Class Bulk Only Transport 1.0. In FIG. 1, only the circuit for data transfer in the device 12 is illustrated.

The device 12 is provided with a physical layer circuit (PHY) 14, a link layer circuit (LINK) 15, first to third end points 16, 17, 18 and a controller 19.

The physical layer circuit 14 in the device 12 is connected to the host PC 11 via the USB bus 13. Moreover, the physical layer circuit 14 is connected to the link layer circuit 15, which is connected to the end points 16 to 18. Moreover, the end points 16 to 18 are connected to the controller 19.

The physical layer circuit 14 converts an electrical signal inputted via the USB bus 13 to a logical signal to be processed by the link layer circuit 15 and then outputs this logical signal to the link layer circuit 15. Moreover, the physical layer circuit 14 converts the logical signal inputted from the link layer circuit 15 to an electrical signal and then outputs this electrical signal to the USB bus 13.

The link layer circuit 15 determines the type of the packet received and then outputs this packet to the first end point 15 or to the third end point 18. In addition, the link layer circuit 15 fetches a transmitted packet from the first end point 16 or second end point 17 and outputs the logic signal to the physical layer circuit 14 depending on such packet.

The first end point (Control End Point) 16 is a FIFO buffer having a transmission/reception type transfer function and is mainly used for initialization of the device 12. The second end point (Bulk-In End Point) 17 and the third end point (Bulk-Out End Point) 18 are FIFO buffers having a transmission type transfer function and a reception type transfer function, respectively. These end points 17, 18 are used for data read/write and command transfer to a data recording portion (not illustrated).

Namely, the first end point 16 is used for transmission and reception of the command for the initialization operation (including the clear feature command) in the device 12. Moreover, the second end point 17 is used for data transmission, while the third end point 18 is used for data reception.

The controller 19 is a circuit for controlling data transfer and is provided with a clear feature (CF) detecting portion 19a and a STALL packet (ST) transmitting portion 19b. The CF detecting portion 19a is a circuit for detecting the clear feature command generated by the host PC 11, while the ST transmitting portion 19b is a circuit for transmitting the STALL packet.

In the device 12 of this embodiment, the clear feature command received from the host PC 11 is transferred to the CF detecting portion 19a of the controller 19 via the first end point 16. The STALL packet is transmitted from the ST transmitting portion 19b of the controller 19 via the second end point 17.

Figure 2:
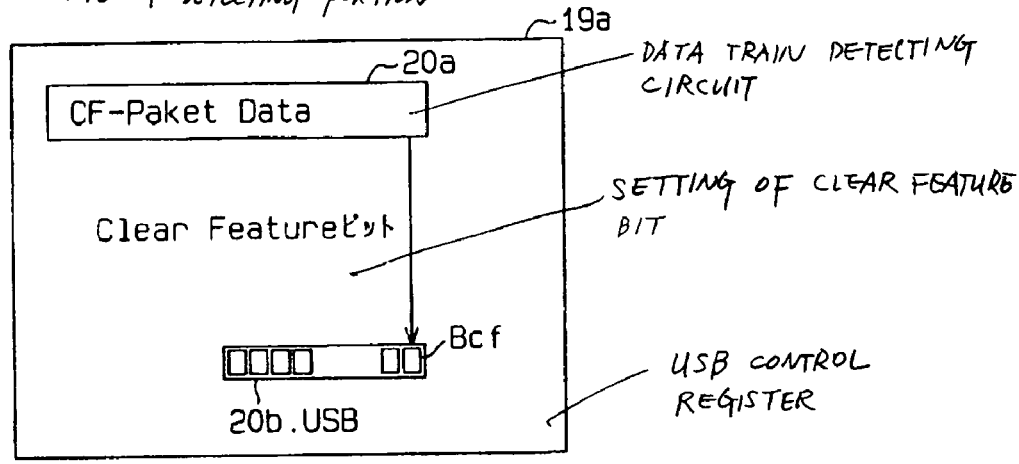
FIG. 2 is a block diagram illustrating a CF detecting portion.

As illustrated in FIG. 2, the CF detecting portion 19a is provided with a CF-PacketData train detecting circuit 20a and a USB control register 20b. The CF-PacketData train detecting circuit 20a monitors the data packets from the first end point (Control End Point) 16 and sets, upon detection of the Data train of the Clear Feature, the Clear Feature detection bit Bcf in the USB control register 20b.

Next, operations of the communication system of this embodiment will be described.

Figure 3:
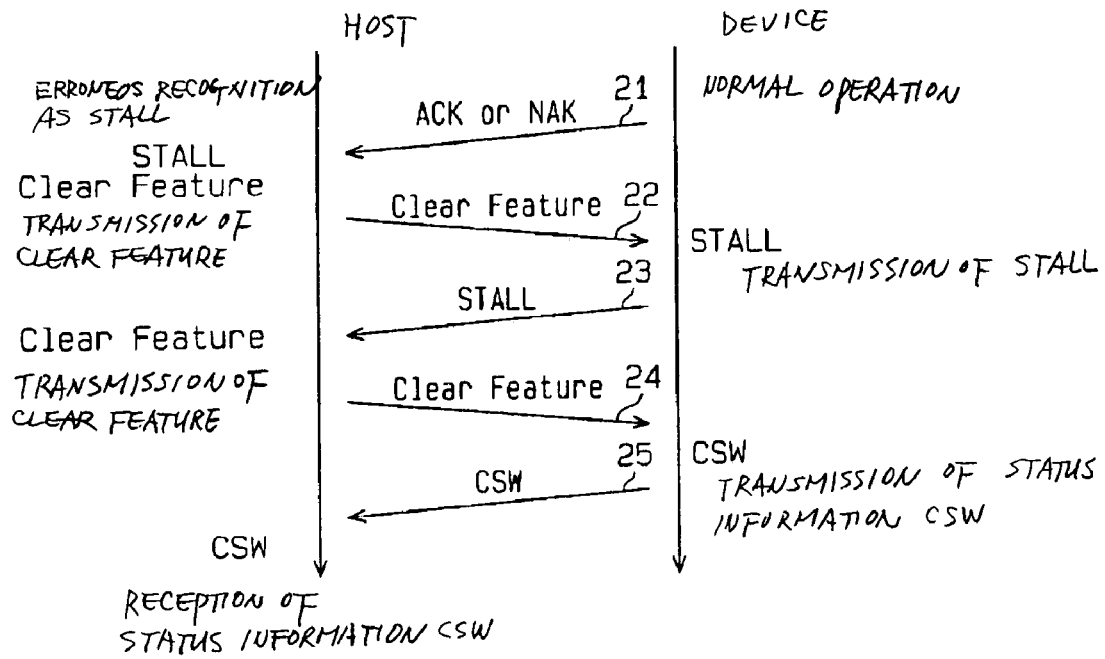
FIG. 3 is a diagram for describing operations in erroneous recognition.

As illustrated in FIG. 3, the normally operating device 12 transmits the ACK packet or NAK packet (step 21). In this case, when the packet is transmitted erroneously due to external noise and the host PC 11 erroneously recognizes that the STALL packet is received, the host PC 11 transmits a packet including the clear feature command to the device 12 (step 22).

The device 12 receives this clear feature. Conventionally, the device 12 operates would not transmit the STALL packet. However, in the present invention, the CF detecting portion 19a detects the clear feature command. Therefore, the device 12 transmits the STALL packet for verification to the host PC 11 (step 23). Since the STALL packet is transmitted, the protocol phase is matched between the host PC 11 and the device 12, even if the STALL packet is erroneously recognized or not.

Thereafter, the host PC 11 again transmits the clear feature packet (step 24). In this case, the device 12 determines that the clear feature command is received for the STALL packet transmitted in the step 23 and transmits the status information (CSW) in response to the clear feature command. This status information is transmitted as the bulk-in data packet via the second end point 17. Accordingly, the status information is transmitted and received between the host PC 11 and the device 12. The data transfer is started again when the transaction is executed for the status information.

Moreover, when the device 12 erroneously recognizes the signal received from the host PC 11 as the clear feature command, deviation between protocols on both devices can be prevented when the device 12 transmits the STALL packet to the host PC 11.

As described above, the present embodiment provides the following effects.

(1) When the host PC 11 erroneously recognizes the STALL packet, such erroneous recognition is detected by the CF detecting portion 19a. In particular, when the host PC 11 erroneously recognizes that it has received the STALL packet, even if the device 12 has transmitted the ACK packet or NAK packet, the host PC 11 outputs the clear feature command. Therefore, such erroneous recognition by the host PC 11 is detected with the clear feature command. When erroneous recognition occurs, the STALL packet is transmitted from the ST transmitting portion 19b in order to adjust deviation of the protocol phase. Therefore, since the status information can be transmitted and received correctly, the data transfer can be started again without resetting the device 12.

(2) Since the problem of system-down time due to the resetting of the device 12 can be avoided, reliability of communication system can be improved.

Second Embodiment

The second embodiment embodying the present invention will be described below.

In the communication system of the first embodiment, deviation of protocol phase has been avoided through control in the device 12, but in the communication system of the second embodiment, deviation of protocol phase is avoided through control in the host PC.

Figure 4:
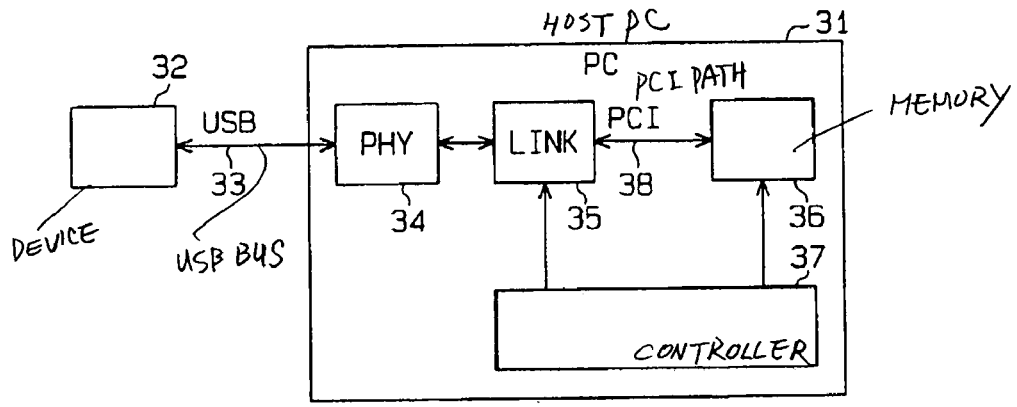
FIG. 4 is a block diagram illustrating a second embodiment.

As illustrated in FIG. 4, the host PC 31 is connected to the device 32 via the USB bus 33. The device 32 is the hard disk drive conforming to the USB Mass Storage Class Bulk Only Mode 1.0. In FIG. 4, only the circuit for data transfer in the host PC 31 is illustrated.

The host PC 31 is provided with a physical layer circuit (PHY) 34, a link layer circuit (LINK) 35, a memory 36 and a controller 37. The physical layer circuit 34 is connected to the device via the USB bus 33. Moreover, the physical layer circuit 34 is connected to the link layer circuit 35, which is connected to the controller 37. Moreover, the link layer circuit 35 is connected to the memory 36 via the PCI bus 38 and the memory 36 is connected to the controller 37.

The physical layer circuit 34 converts an electrical signal inputted via the USB bus 33 to a logic signal processed by the link layer circuit 35 and then outputs this logic signal to the link layer circuit 35. Moreover, the physical layer circuit 34 converts the logic signal inputted from the link layer circuit 35 to an electrical signal and then outputs this electrical signal to the USB bus 33.

The link layer circuit 35 stores the received packet to the memory 36 via the PCI bus 38 and outputs, to the physical layer circuit 34, the logic signal corresponding to the transmitted packet fetched from the memory 36 via the PCI bus 38.

The controller 37 controls data transfer by management of data transmission and reception between the link layer circuit 35 and memory 36.

Next, operations of the communication system of this embodiment will be described.

Figure 5:
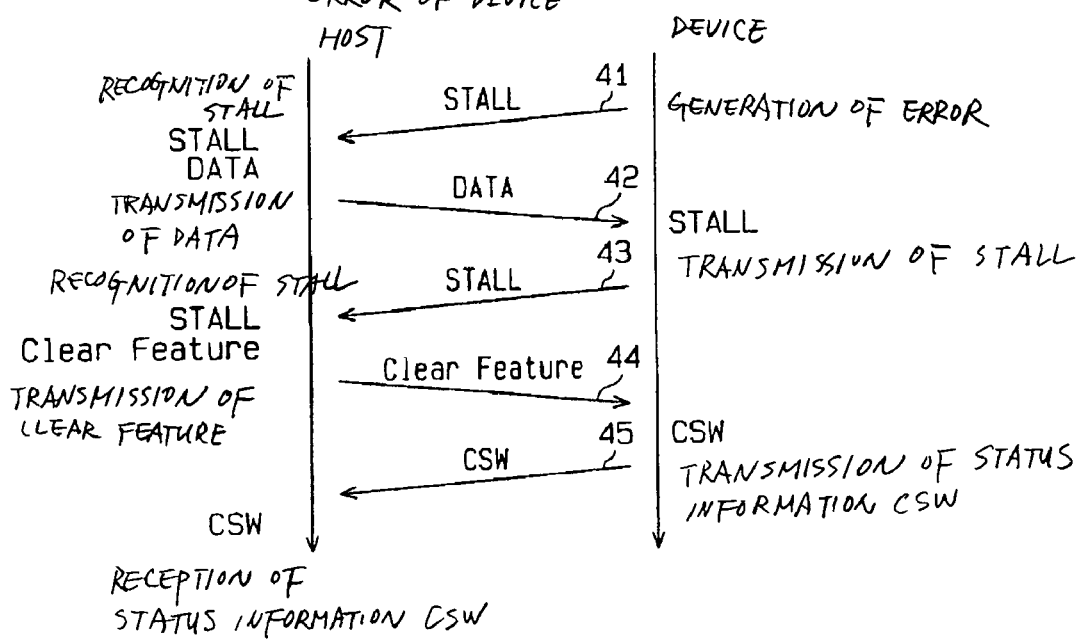
FIG. 5 is a diagram for describing operations in occurrence of error in the device.

As illustrated in FIG. 5, when an error is generated in the device 32 and a response to the data transfer request from the host PC 31 cannot be sent, the device 32 transmits the STALL packet (step 41). The host PC 31 receives this STALL packet. In this embodiment, the host PC 31 does not immediately transmit, upon reception of the STALL packet, the clear feature command but executes again the data transfer request (step 42).

Thereafter, when the device 32 transmits the second STALL packet (step 43) and the host PC 31 receives this STALL packet, it is determined that the data transfer phase in the device 32 is suspended. Here, the host PC 31 transmits the clear feature command to the device 32 (step 44). The device 32 clears the end point in response to the clear feature command and then transmits the status information (CSW) from the bulk-in end point (step 45). Accordingly, the status information can be transmitted and received between the host PC 31 and the device 32. Thereafter, the data transfer is started again with execution of the transaction for such status information.

Next, operations when the host PC 31 erroneously recognizes the ACK packet or NAK packet transmitted from the device 32 as the STALL packet will be described.

Figure 6:
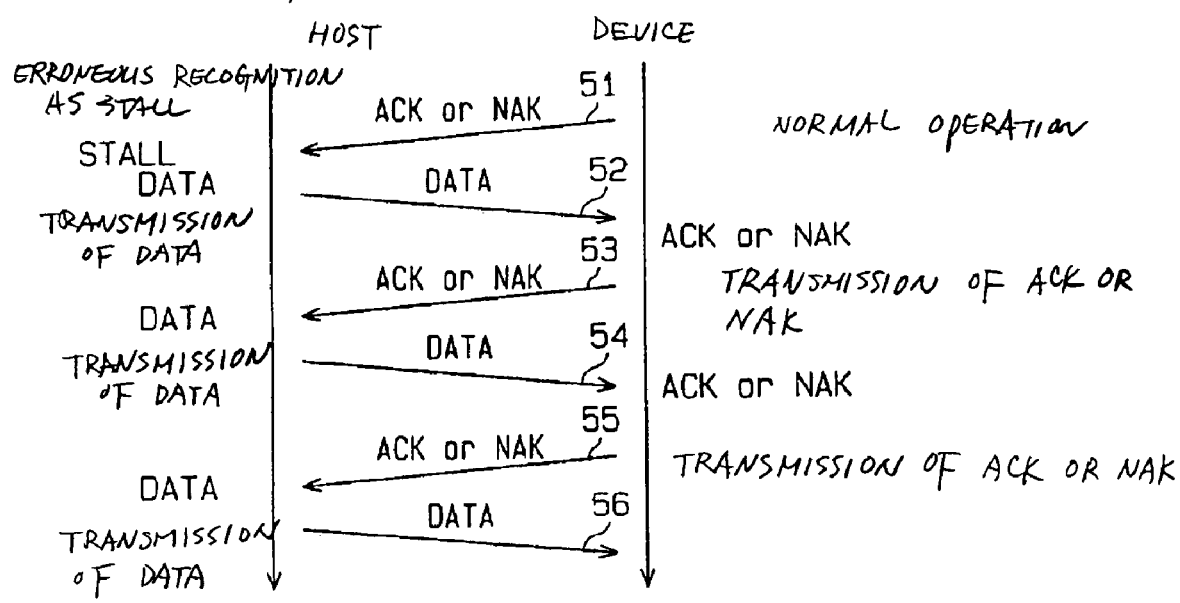
FIG. 6 is a diagram for describing operations in erroneous recognition.

As illustrated in FIG. 6, the normally operating device 32 transmits the ACK packet or NAK packet (step 51). This packet may be erroneously transmitted with influence of external noise and the host PC 31 may erroneously recognize that it has received the STALL packet. In this case, the host PC 31 does not immediately transmit the clear feature command but executes again the data transfer request (step 52).

Thereafter, the device 32 transmits the ACK packet or NAK packet in response to the data transfer request (step 53). Upon reception of the normal packet (ACK packet or NAK packet), the host PC 31 determines that the device 32 is operating normally and executes the data transfer request (step 54). In the subsequent process, the ordinary data transfer is performed between the host PC 31 and the device 32 (steps 55, 56).

As described above, this second embodiment provides following effects.

(1) When the packets received by the host PC 31 from the device 32 are erroneously recognized twice in a row as STALL packets, the host PC 31 transmits the clear feature command. Thereby, when the host PC 31 erroneously recognizes the STALL packet, recovery may be realized in the transaction level of the data transfer. Accordingly, deviation of the protocol by erroneous recognition by the host PC 31 can be avoided and it is no longer required to reset the device 32.

(2) A problem of system-down time due to the resetting of the device 32 can be avoided and reliability of communication system can be improved.

(3) In this second embodiment, since recovery may be realized in the transaction level of the data transfer, overhead for avoiding the process when the STALL packet is erroneously recognized can be reduced more in comparison with the overhead reduction in the first embodiment.

Third Embodiment

The third embodiment of the present invention will be described. However, differences from the first embodiment will mainly be described.

Figure 7:
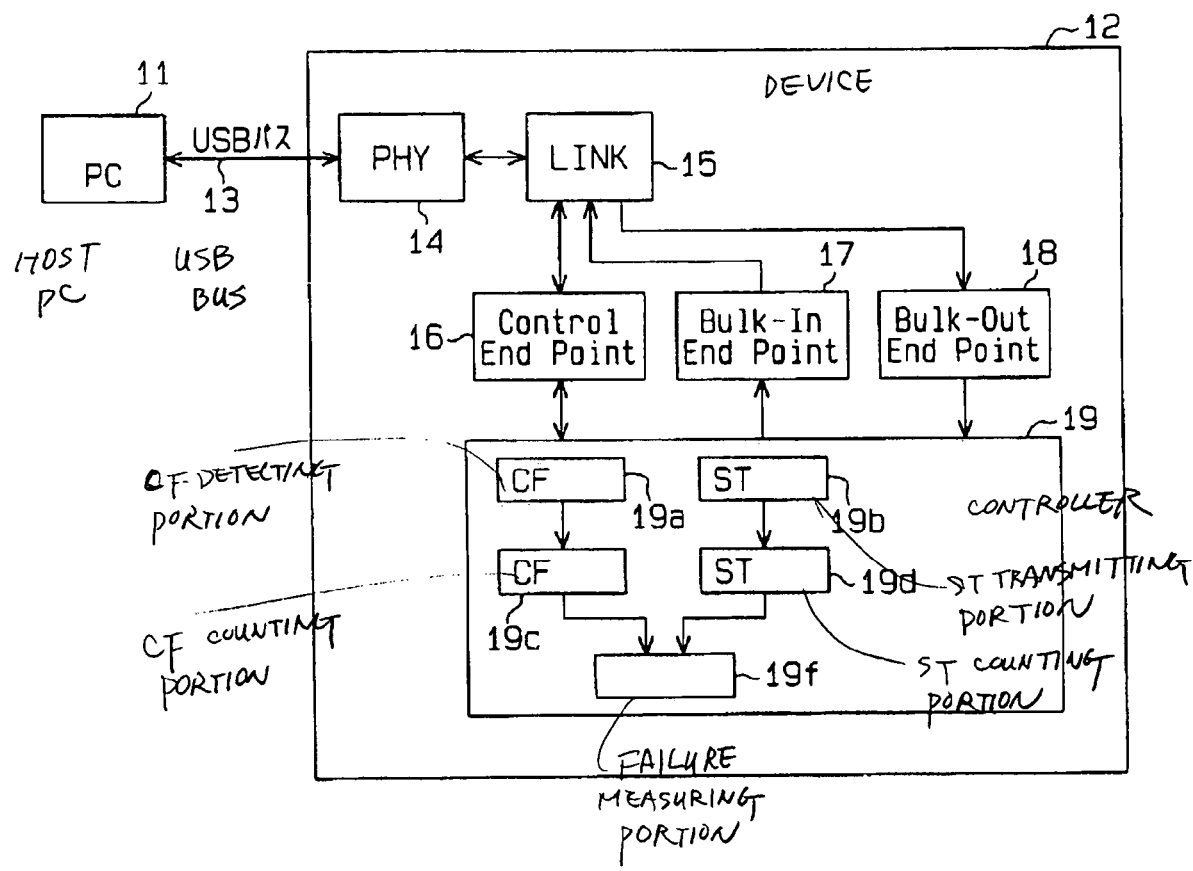
FIG. 7 is a block diagram illustrating a third embodiment.
Figure 8:
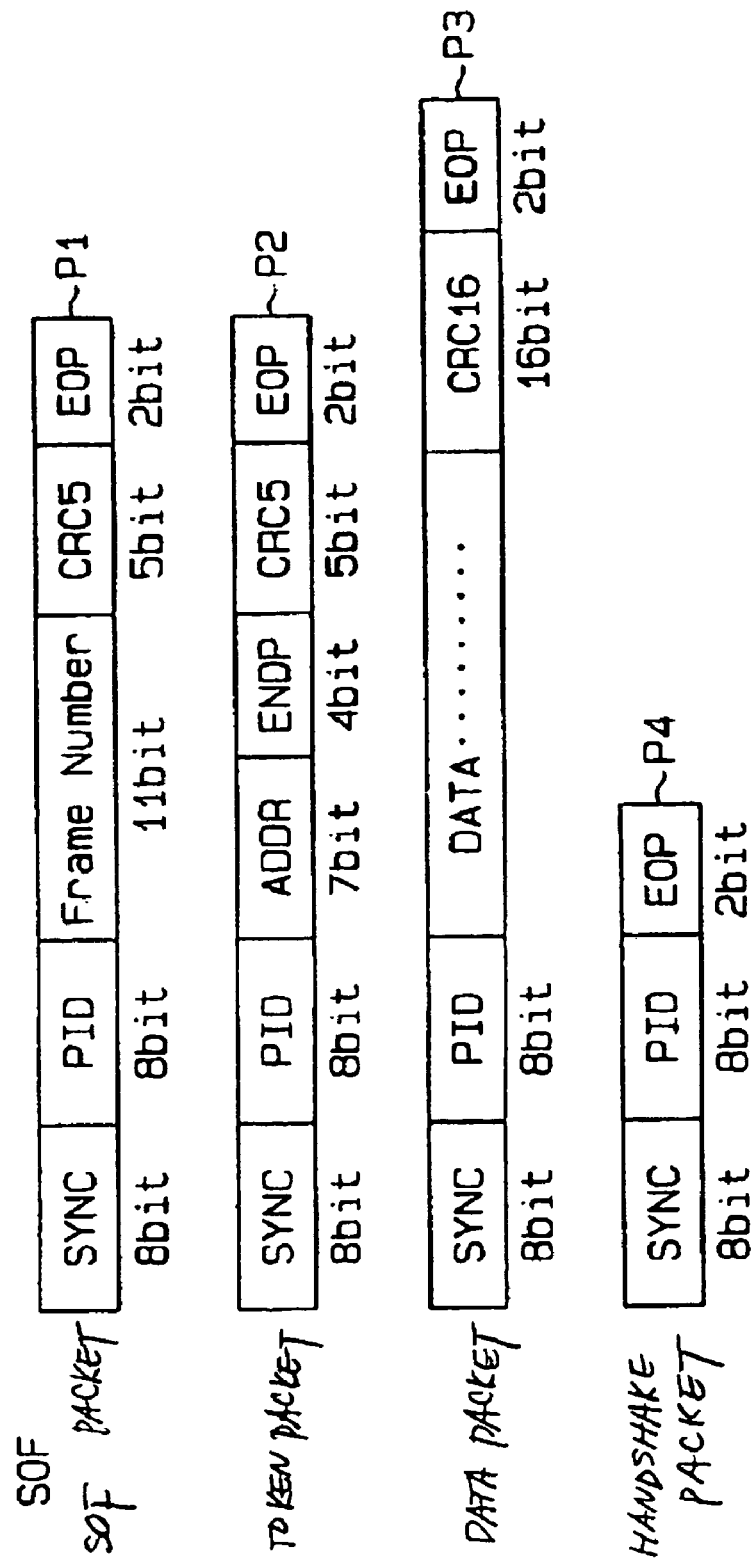
FIG. 8 is a diagram for describing formats of packets.
Figure 9:
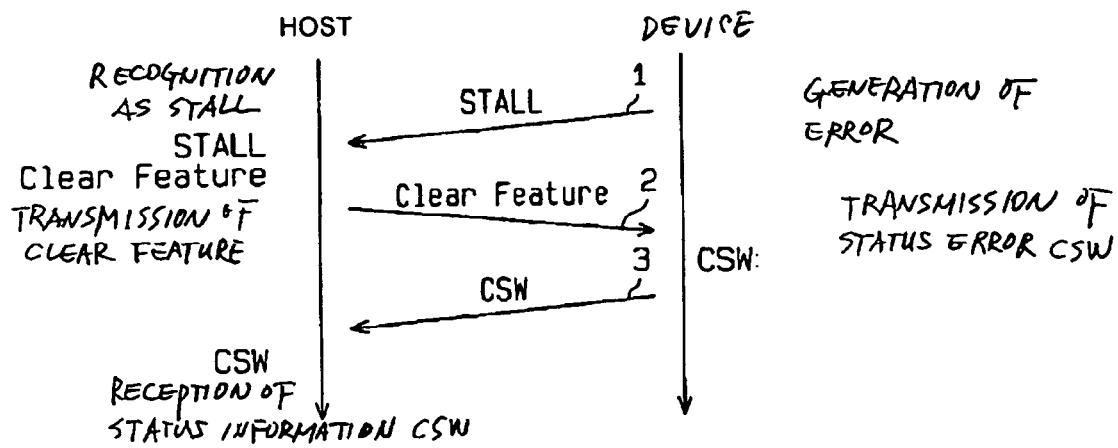
FIG. 9 is a diagram for describing operations in occurrence of error in the device.
Figure 10:
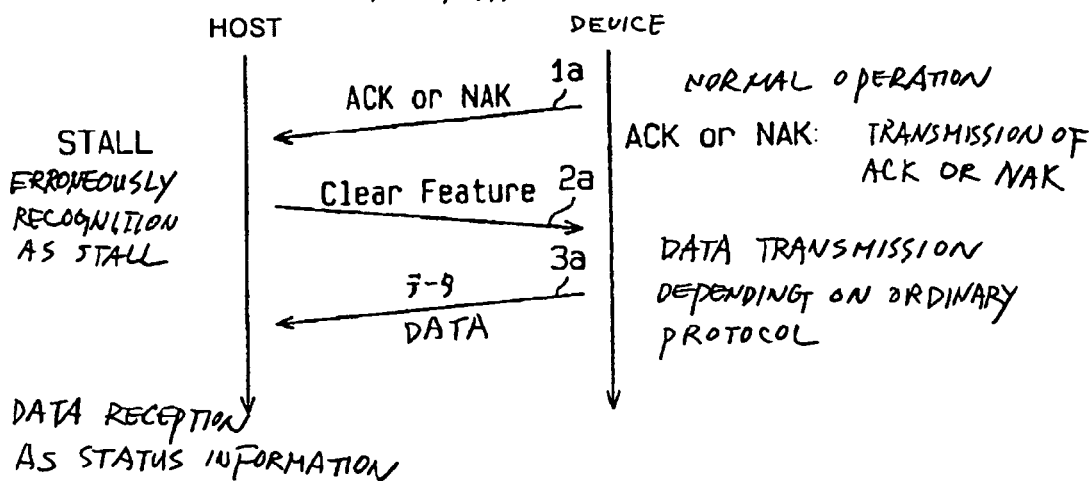
FIG. 10 is a diagram for describing operations in erroneous recognition.

As illustrated in FIG. 7, the controller 19 in the device of this embodiment comprises the CF detecting portion 19a, the ST transmitting portion 19b, a CF counting portion 19c, a ST counting portion 19d, and a failure measuring portion 19f.

The CF counting portion 19c counts the number of times the clear feature command is received, as detected by the CF detecting portion 19a and then outputs the number of times of reception to the failure measuring portion 19f. The ST counting portion 19d counts the number of times STALL packets are transmitted by the ST transmitting portion 19b and outputs the number of times of transmission to the failure measuring portion 19f. The failure measuring portion 19f measures the number of times of failure in the phase based on the number of times of reception of the clear feature command and the number of times of transmission of the STALL packet.

Namely, in the USB communication protocol, after the STALL packet is transmitted to the host PC 11 from the device 12, the clear feature command is issued to the device 12 from the host PC 11. Therefore, if a phase failure is not generated, the number of times of transmission of the STALL packet becomes equal to the number of times of reception of the clear feature command. Therefore, the number of times of occurrence of a phase failure can be determined by calculating the difference between the number of times of transmission of the STALL packet and the number of times of reception of the clear feature command. The number of times of occurrence of the phase failure is the number of times of occurrence of the erroneous recognition of the STALL packet by the host PC 11 or the number of times of occurrence of unexpected deviation of the protocols corresponding to such erroneous recognition.

The number of times of phase failure calculated by the failure measuring portion 19*f* is used as the data for self-diagnosis. In particular, when the device 12 is provided with a display, if such phase failure occurs frequently, an alarm corresponding to the number of times of occurrence of phase failure may be displayed on the display. For example, moreover, it is also possible to display an alarm due to phase failure on the display of the host PC 11 by transmitting the number of times of phase failure to the host PC 11 in response to the data transfer request from the host PC 11.

As described above, this third embodiment provides the following effects.

(1) The CF counting portion 19*c* counts the number of times of reception of the clear feature command, the ST counting portion 19*d* counts the number of times of transmission of the STALL packet and the number of times of phase failure in the communication system can be measured based on these number of times of transmission and the number of times of reception.

(2) Reliability of the communication system can be evaluated using the number of times of phase failure measured by the failure measuring portion 19*f*.

Each embodiment may also be varied as described below.

In each embodiment, the present invention has been applied to a hard disk drive but can also be applied to the other devices, for example, ATA/ATAPI devices such as magneto-optic (MO), DVD and CD, or peripheral devices of personal computers, such as printers or scanners, etc.

In the controller 19, the CF detecting portion 19*q*, ST transmitting portion 19*b*, CF measuring portion 15*c*, ST counting portion 19*d* and failure measuring portion 19*f* may be realized by using hardware circuitry. However, the controller 19 is not limited thereto and the functions of each element 19*a* to 19*f* can be realized with a program executed by the controller 19.

I claim:

1. A method of communicating data between a device and a host apparatus through a USB interface comprising the steps of:
    transmitting a first packet which is not a STALL packet from the device to the host apparatus, the first packet being erroneously recognized by the host apparatus as the STALL packet;
    receiving a second packet which is a response packet for the STALL packet from the host apparatus at the device in response to the first packet; and
    transmitting a third packet from the device to the host apparatus, the third packet which is the STALL packet, in response to receiving the second packet from the host apparatus.

2. The method of claim 1, wherein the second packet is a clear feature command packet.

3. The method of claim 2, wherein the method further comprises the step of:
    receiving a fourth packet from the host apparatus at the device, the fourth packet being a clear feature command packet, the fourth packet transmitted from the host apparatus in response to receiving the third packet from the device.

4. The method of claim 3, wherein the method further comprises the step of:
    transmitting status information from the device to the host apparatus, in response to receiving the fourth packet from the host apparatus.

5. The method of claim 4, wherein a type of the first packet transmitted from the device is an ACK packet or a NAK packet.

6. The method of claim 5, wherein the data communications is performed using USB Mass Storage Class Bulk Only Mode.

7. A method of communicating data between a device and a host apparatus through a USB interface comprising the steps of:
    transmitting a first request for data from the host apparatus to the device;
    receiving a first packet from the device at the host apparatus in response to the first request for data;
    transmitting a second request for data from the host apparatus to the device, in response to receiving the first packet from the device; and
    receiving a second packet from the device at the host apparatus in response to the second request for data;
    wherein the first packet is transmitted from the device is an ACK packet or a NAK packet, but the host apparatus erroneously recognizes the first packet as a STALL packet; and
    wherein the second packet is a STALL packet.

8. The method of claim 7, wherein the method further comprises the step of:
    transmitting a clear feature command packet from the host apparatus to the device, in response to receiving the second packet from the device.

9. The method of claim 8, wherein the method further comprises the step of:
    receiving status information from the device at the host apparatus, the status information transmitted from the device in response to receiving the clear feature command packet from the host apparatus.

10. The method of claim 7, wherein the data communications is performed using USB Mass Storage Class Bulk Only Mode.

11. In a device operable to communicate data with a host apparatus through a USB interface, apparatus comprising:
    a packet detector operable to detect a second packet which is a response packet for a STALL packet from the host apparatus, the second packet transmitted from the host device in response the host device receiving a first packet which is not a STALL packet from the device, the first packet being erroneously recognized by the host apparatus as the STALL packet; and
    a packet transmitter operable to transmit a third packet to the host apparatus, the third packet which is the STALL packet, in response to receiving the second packet from the host apparatus.

12. The apparatus of claim 11, wherein the second packet is a clear feature command packet.

13. The apparatus of claim 12, wherein the packet detector is further operable to receive a fourth packet from the host apparatus, the fourth packet being a clear feature command packet, the fourth packet transmitted from the host apparatus in response to receiving the third packet from the device.

14. The apparatus of claim 13, further comprising:
    circuitry operable to transmit status information to the host apparatus, in response to receiving the fourth packet from the host apparatus.

15. The apparatus of claim 14, wherein a type of the first packet transmitted from the device is an ACK packet or a NAK packet.

16. The apparatus of claim 15, wherein the data communications is performed using USB Mass Storage Class Bulk Only Mode.

17. In a host apparatus operable to communicate data with a device through a USB interface, apparatus comprising:
- transmitting circuitry operable to transmit a first request for data to the device; receiving circuitry operable to receive a first packet from the device in response to the first request for data;
- transmitting circuitry operable to transmit a second request for data to the device, in response to receiving the first packet from the device; and
- receiving circuitry operable to receive a second packet from the device in response to the second request for data;
- wherein the first packet is transmitted from the device as an ACK packet or a NAK packet, but the host apparatus erroneously recognizes the first packet as a STALL packet; and
- wherein the second packet is a STALL packet.

18. The apparatus of claim 17, wherein the apparatus further comprises:
- transmitting circuitry operable to transmit a clear feature command packet to the device, in response to receiving the second packet from the device.

19. The apparatus of claim 18, wherein the apparatus further comprises:
- receiving circuitry operable to receive status information from the device, the status information transmitted from the device in response to receiving the clear feature command packet from the host apparatus.

20. The apparatus of claim 19, wherein the data communications is performed using USB Mass Storage Class Bulk Only Mode.

* * * * *